Aug. 3, 1965     T. F. FACIUS     3,198,441

NOZZLE BODY AND GROMMET ASSEMBLY

Filed March 11, 1964

INVENTOR
Thomas F. Facius

BY
Stevens, Davis, Miller & Mosher
ATTORNEYS 3,198,441
NOZZLE BODY AND GROMMET ASSEMBLY
Thomas F. Facius, Baltimore, Md., assignor to Baltimore
 Aircoil Company, Inc., Baltimore, Md., a corporation
 of Maryland
Filed Mar. 11, 1964, Ser. No. 351,166
1 Claim. (Cl. 239—550)

This invention relates to evaporative heat exchangers and more particularly to a new type of spray head installation and method of assembling the same.

In the art of evaporative heat exchangers it is usual to spray water which flows countercurrent to air in droplet or rain-like form through a heat exchanger. Some of the water evaporates and the heat of vaporization is extracted from whatever is to be cooled. Such systems are commonly used to condense and cool refrigerants and to cool water. In the later case some of the water is evaporated and the heat of vaporization is extracted from the remaining water which is thus cooled.

With the increasing sale of air conditioning equipment of large capacity such as is used for office buildings, apartment buildings, etc., the number of evaporative heat exchangers in use is increasing rapidly and every part of the system is receiving scrutiny from a cost point of view. Up to the present time, the spray heads which provide the water for an evaporative heat exchanger have been made in the form of a series of tubes, each provided with a plurality of nozzles, the tubes being so spaced in relation to one another as to cover the area of the heat exchanger therebelow. These spray heads have heretofore been made by drilling holes in a pipe and tapping these holes. Each nozzle is provided with a threaded portion complementary to the threads of the hole in the pipe and thus the nozzles may be screwed into position in spaced relation along the pipe, usual plumbing practice being employed to prevent leakage.

The foregoing system is perfectly satisfactory from the point of view of operation but it suffers from several deficiencies from the point of view of assembly and cost. In the first place the labor necessary to drill and tap holes in the pipes and to thread the bushing on the nozzles is considerable. Furthermore the installation requires the use of a manual or power wrench through which the nozzle is rotated a number of times to screw it water tight in the pipe aperture.

It is an object of the present invention to eliminate the foregoing costly steps and to provide a spray nozzle arrangement that is characterized by reduced manufacturing and assembly costs by which the threading of both the holes in the pipe and the bushings on the nozzles is avoided and at the same time assembly is expedited so that it may be performed more quickly and efficiently.

Other objects and advantages of this invention will be apparent upon consideration of the following detailed description thereof in conjunction with the annexed drawings wherein.

Figure 1:
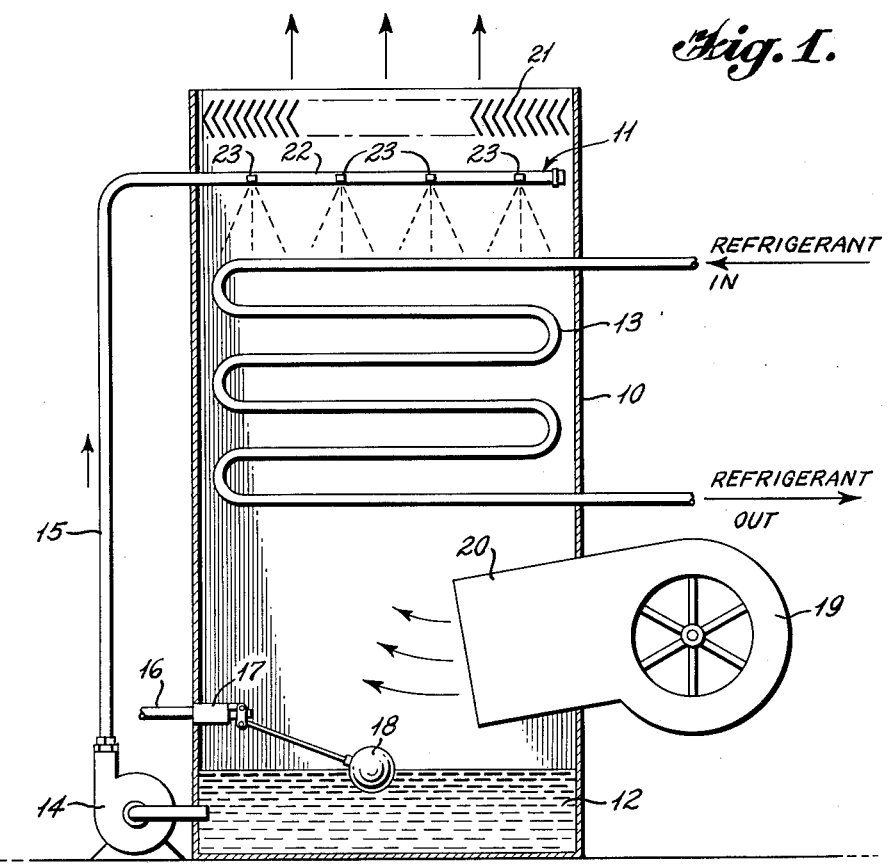
FIGURE 1 is a schematic view in elevation of an evaporative heat exchanger provided with spray nozzles in accordance with the teachings of the present invention.

If now detailed reference is made to FIGURE 1, it can be seen that a chamber 10 is provided at its upper end with a spray head 11 and at its lower end with a sump 12. Water issuing from the spray head 11 passes over heat exchanger tubes 13 in the form of rain or droplets and is collected in the sump 12 from which it is re-circulated by a pump 14 and conduit 15 back to the spray head 11. Make-up water enters through a conduit 16 when a valve 17 is opened by reason of lowering of the float 18. A centrifugal fan 19 pumps air through ducting 20 and this air flows upwardly through the chamber 10 countercurrent to the water issuing from the spray head 11. The air leaves the chamber through mist eliminators 21 which are in the form of baffles covering the cross section of the upper end of the chamber 10. If a fluid to be cooled is circulated through a heat exchanger 13, heat is extracted from its in order to vaporize some of the water issuing from the spray head 11.

The foregoing is a brief description of an evaporative heat exchanger which is conventional in structure and operation except for the spray head 11.

In the construction of the present invention, the spray head 11 is comprised of a number of pipes suitably manifolded so that the nozzles served thereby functioning together can cover the area in plan of the heat exchanger 13.

Figure 2:
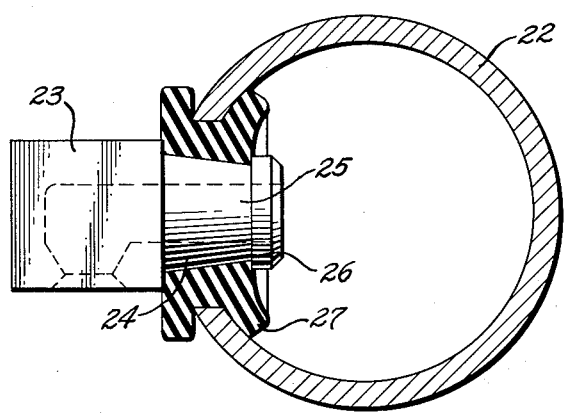
FIGURE 2 is a view in section and in much enlarged scale of a water supply pipe for a spray head showing in detail one nozzle mounted in accordance with the principles of the present invention.

In FIGURES 1 and 2 one of these pipes is designated by reference numeral 22 and it shown to an enlarged scale in FIGURE 2 so that the manner of installation of the nozzles can be understood. The nozzles are designated by numeral 23 and in FIGURE 2 one of these nozzles is shown at 90° from the point of view of FIGURE 1. From this position it can be seen that each nozzle 23 has a bushing 24 through which water is supplied to the nozzle from the pipe 22. The bushing 24 includes a frusto-conical portion 25 which projects through an unthreaded hole in the pipe 22 and a flange 26 which lies wholly within the pipe 22. Surrounding the bushing 24 and clamped between the nozzle housing 23 and the flange 26, is a flexible grommet 27 of rubber or rubber-like material. This grommet is provided externally with a circumferential central groove which receives the defining edge of the hole in the pipe 22. The inner portion of the grommet in repose defines a cylindrical port and in position this is distorted so as to engage tightly the frusto-conical bushing portion 25 of the nozzle assembly.

By resort to the construction shown it is possible to install the nozzles very rapidly. The grommets are placed in position one in each hole in the pipe such as 22 and the nozzles are forced through the central aperture manually. This causes temporary deformation of the grommet sufficient to permit passage of the flange 26 through the central hole after which time the grommet, by its own resiliency, restores itself to the position shown in FIGURE 2.

What is claimed is:

In an evaporative heat exchanger, a rigid pipe to supply cooling water to the region of heat exchange, said pipe having a plurality of holes therein, a nozzle body for each hole, each body including a portion external to the pipe, a bushing extending through a hole in said pipe and a flange at the end of the bushing which lies within the pipe and a flexible grommet engaging said bushing and the defining edges of a pipe hole as well as a portion of the inner and outer surface of the pipe adjacent to said hole, said body wholly defining a flow channel through said flange, bushing and external portion, said external portion and said flange both having a diameter greater than that of the bushing adjacent to the flange.

References Cited by the Examiner

UNITED STATES PATENTS

| | | | |
|---|---|---|---|
| 1,762,313 | 6/30 | Snow et al. | 239—550 |
| 2,296,715 | 9/42 | Komar | 239—602 |
| 2,314,525 | 3/43 | Summers | 239—557 |
| 2,811,392 | 10/57 | Warp | 239—602 |
| 3,009,655 | 11/61 | Palmer | 239—271 |
| 3,021,976 | 2/62 | Tracy | 239—602 |

FOREIGN PATENTS 1,055,869    4/59    Germany.

M. HENSON WOOD, JR., *Primary Examiner.*

EVERETT W. KIRBY, *Examiner.*